United States Patent
Soni

(10) Patent No.: US 9,515,864 B2
(45) Date of Patent: Dec. 6, 2016

(54) DIFFERENTIATED SERVICE BEHAVIOR BASED ON DIFFERENTIATED SERVICES CODE POINT (DSCP) BITS

(71) Applicant: Verizon Patent and Licensing Inc., Arlington, VA (US)

(72) Inventor: Shailendra Soni, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 243 days.

(21) Appl. No.: 14/339,638

(22) Filed: Jul. 24, 2014

(65) Prior Publication Data
US 2016/0028636 A1   Jan. 28, 2016

(51) Int. Cl.
*H04L 29/06* (2006.01)
*H04L 12/851* (2013.01)
*H04L 12/801* (2013.01)
*H04L 12/54* (2013.01)

(52) U.S. Cl.
CPC ........... *H04L 29/0653* (2013.01); *H04L 12/56* (2013.01); *H04L 29/06095* (2013.01); *H04L 47/12* (2013.01); *H04L 47/2441* (2013.01)

(58) Field of Classification Search
CPC . H04L 12/56; H04L 29/06095; H04L 29/0653
See application file for complete search history.

(56) References Cited

U.S. PATENT DOCUMENTS

| | | | |
|---|---|---|---|
| 7,295,562 B1* | 11/2007 | Acharya | H04L 47/32 370/412 |
| 2008/0056278 A1* | 3/2008 | Kadambi | H04L 12/46 370/395.53 |
| 2010/0095017 A1* | 4/2010 | Ghetie | H04L 47/10 709/232 |
| 2015/0372928 A1* | 12/2015 | Basilier | H04L 12/4633 370/235 |

OTHER PUBLICATIONS

Wikipedia, "Differentiated services", http://en.wikipedia.org/wiki/Differentiated services, May 16, 2014, 7 pages.

* cited by examiner

*Primary Examiner* — Ashley Shivers

(57) ABSTRACT

A device may be configured to receive an Internet Protocol (IP) packet from a client device. The IP packet may include DiffServ Code Points (DSCP) information and payload data. The device may read the DSCP information included in the IP packet. The device may determine a module to load based on the DSCP information and before reading the payload data included in the IP packet. The device may load the module and provide a service to the client device based on the loaded module and the IP packet.

20 Claims, 6 Drawing Sheets

DIFFERENTIATED SERVICE BEHAVIOR BASED ON DIFFERENTIATED SERVICES CODE POINT (DSCP) BITS

BACKGROUND

Differentiated services or DiffServ is a computer networking architecture that specifies a simple, scalable, and coarse-grained mechanism for classifying and managing network traffic and providing quality of service (QoS) on Internet Protocol (IP) networks. DiffServ may use a differentiated services code point (DSCP) in the IP header for packet classification purposes.

DETAILED DESCRIPTION OF PREFERRED EMBODIMENTS

The following detailed description of example implementations refers to the accompanying drawings. The same reference numbers in different drawings may identify the same or similar elements.

DiffServ may be used to provide low-latency to high-prioritized network traffic such as voice or streaming media, while providing simple best-effort service to low-prioritized services, such as web traffic or file transfers. For example, network devices (e.g., routers, gateways, etc.) may prioritize routing of IP packets sent from a client device to a server device based on the DSCP bits included in the IP packets.

Once the IP packets are received by the server device, the server device may analyze a payload of the IP packets to differentiate between services provided by the server device and identify a service associated with the IP packets (e.g., a voice service, a streaming media service, a web traffic service, a file transfer service, etc.). The server device may determine a service associated with the IP packets based on the payload data and load a module associated with the service to process the IP packets.

However, rather than, or in addition to, determining a module to load based on analyzing the payload data of the IP packets, implementations described herein may determine a module to load to process the IP packets based on reading the DSCP bits included in the received IP packets. Reading the DSCP bits included in the received IP packets may use fewer resources and have less latency than analyzing the payload data. Consequently, implementations described herein may load a module using fewer resources and with less latency than loading a module by analyzing the payload data.

Figure 1:
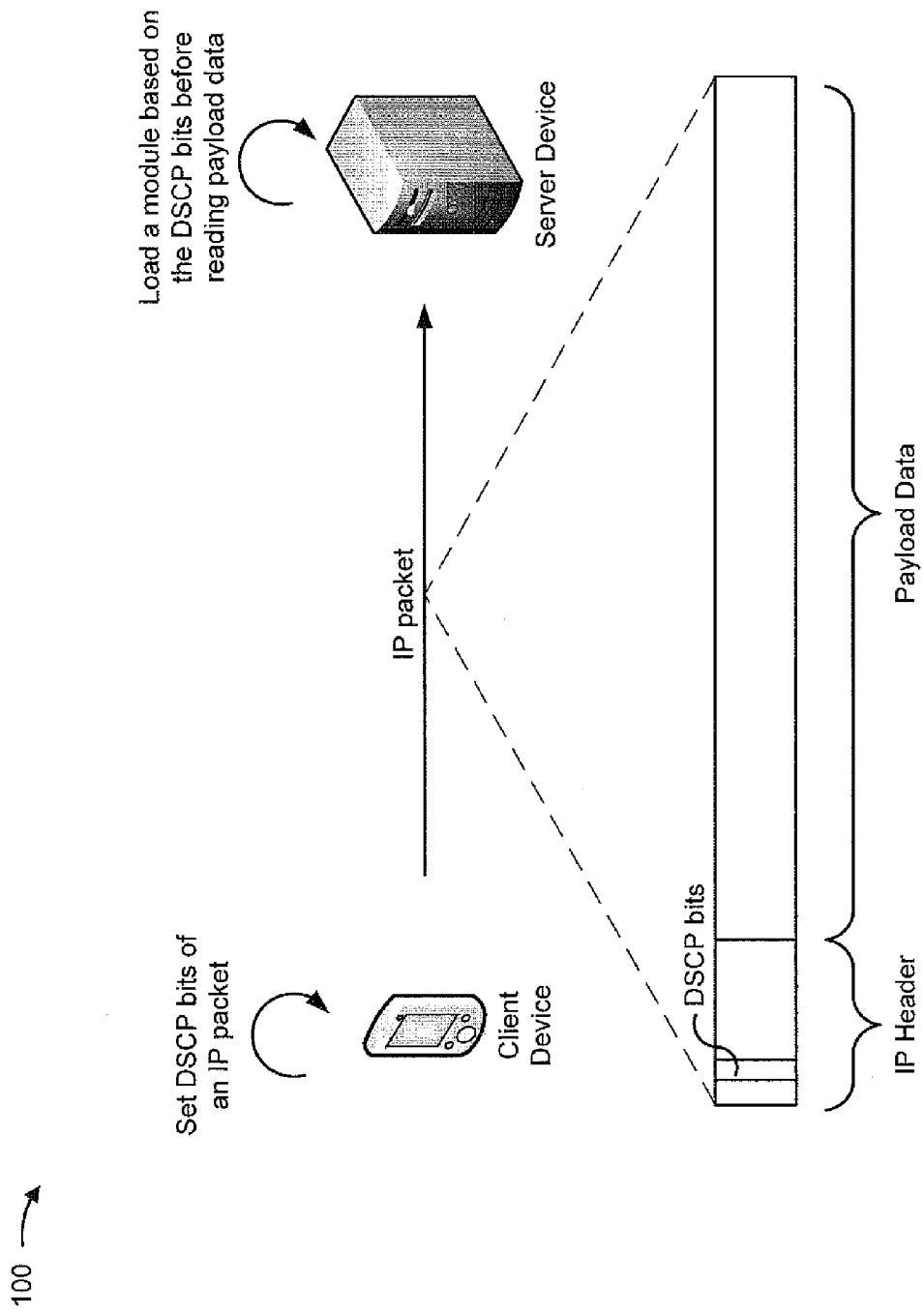
FIG. 1 is a diagram of an overview of an example implementation described herein.

FIG. 1 is a diagram of an overview of an example implementation 100 described herein. In FIG. 1, assume a client device generates an IP packet to send to a server device. As shown in FIG. 1, the IP packet may include an IP header and payload data. The IP header may include DSCP bits and the client device may set the DSCP bits based on a QoS associated with the IP packet.

As shown in FIG. 1, the client device may send the IP packet to the server device, via a network, and the server device may receive the IP packet at a socket. The server device may read the DSCP bits through a socket option (e.g., a socket option call) and determine a module to load based on the value of the DSCP bits. In some implementations, the server device may determine the module to load before the server device reads the payload data of the IP packet and/or independent of the payload data of the IP packet. Thus, the server device may avoid using resources to read the payload data in order to determine which module to load.

Figure 2:
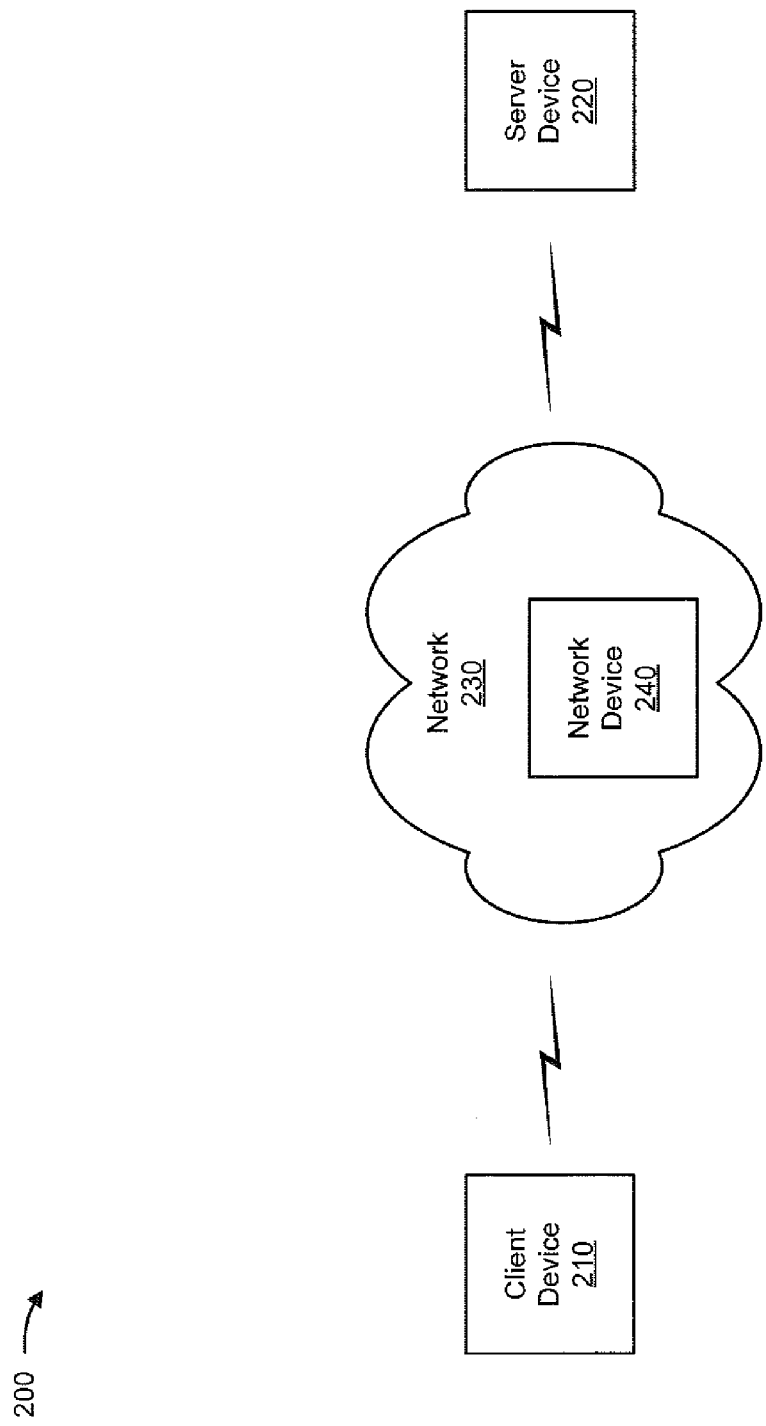
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a network 230, and/or a network device 240. Devices of environment 200 may interconnect via wired connections, wireless connections, or a combination of wired and wireless connections.

Client device 210 may include a device capable of receiving, generating, storing, processing, and/or providing information. For example, client device 210 may include a communications and/or computing device, such as a mobile phone (e.g., a smart phone, a radiotelephone, etc.), a laptop computer, a tablet computer, a handheld computer, a gaming device, or a similar device. In some implementations, client device 210 may receive information from and/or transmit information to another device in environment 200.

Server device 220 may include one or more devices capable of storing, processing, and/or routing information. In some implementations, server device 220 may include a communication interface that allows server device 220 to receive information from and/or transmit information to other devices in environment 200.

Network 230 may include one or more wired and/or wireless networks. For example, network 230 may include a cellular network (e.g., an Long Term Evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network. In some implementations, network 230 may include one or more network devices 240.

Network device 240 may include one or more devices (e.g., one or more traffic transfer devices) capable of processing and/or transferring traffic between devices of environment 200. For example, network device 240 may include a firewall, a router, a gateway, a switch, a hub, a bridge, a reverse proxy, a server device (e.g., a proxy server device), a security device, an intrusion detection device, a load balancer, or a similar device.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
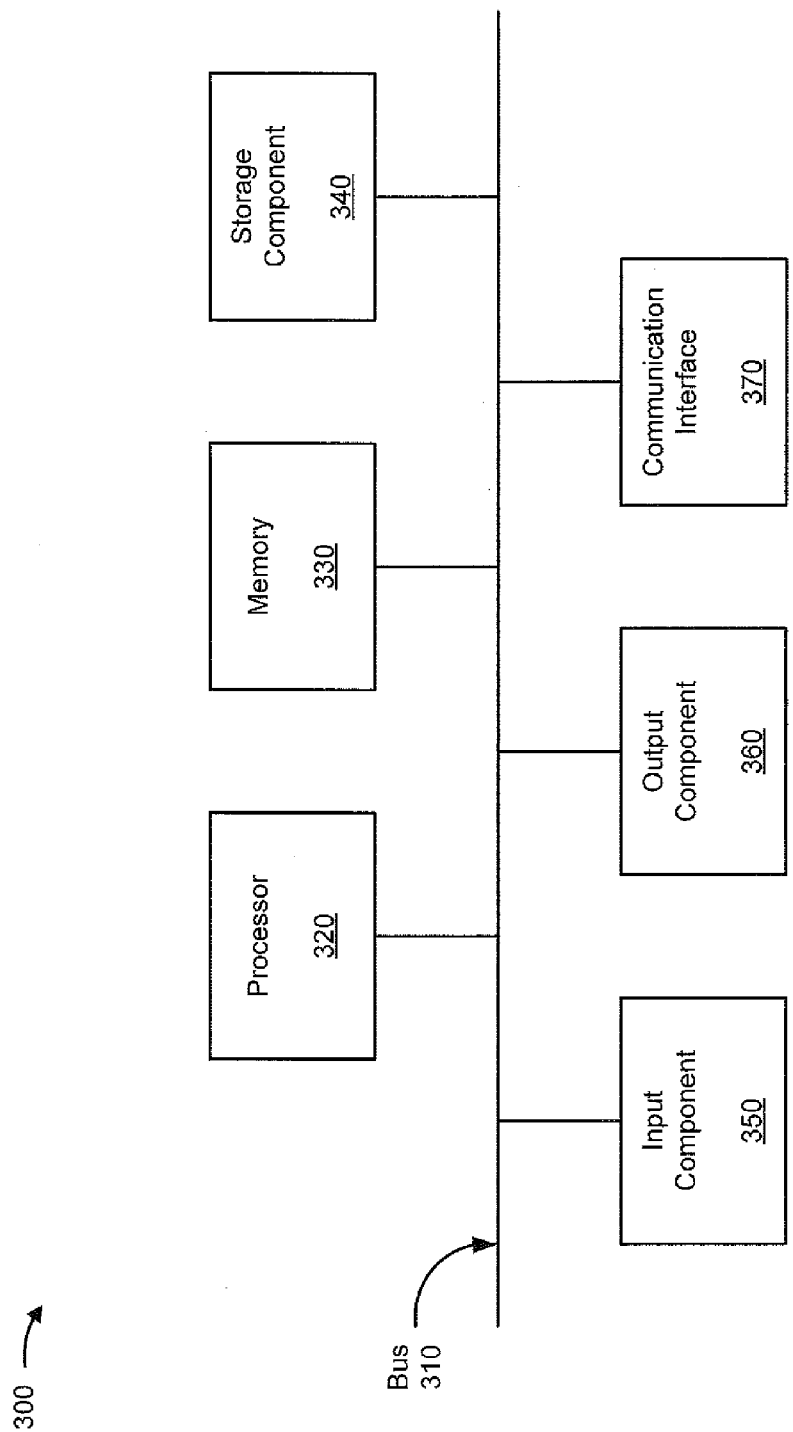
FIG. 3 is a diagram of example components of one or more devices of FIG. 2.

FIG. 3 is a diagram of example components of a device 300. Device 300 may correspond to client device 210, server device 220, and/or network device 240. In some implementations, client device 210, server device 220, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
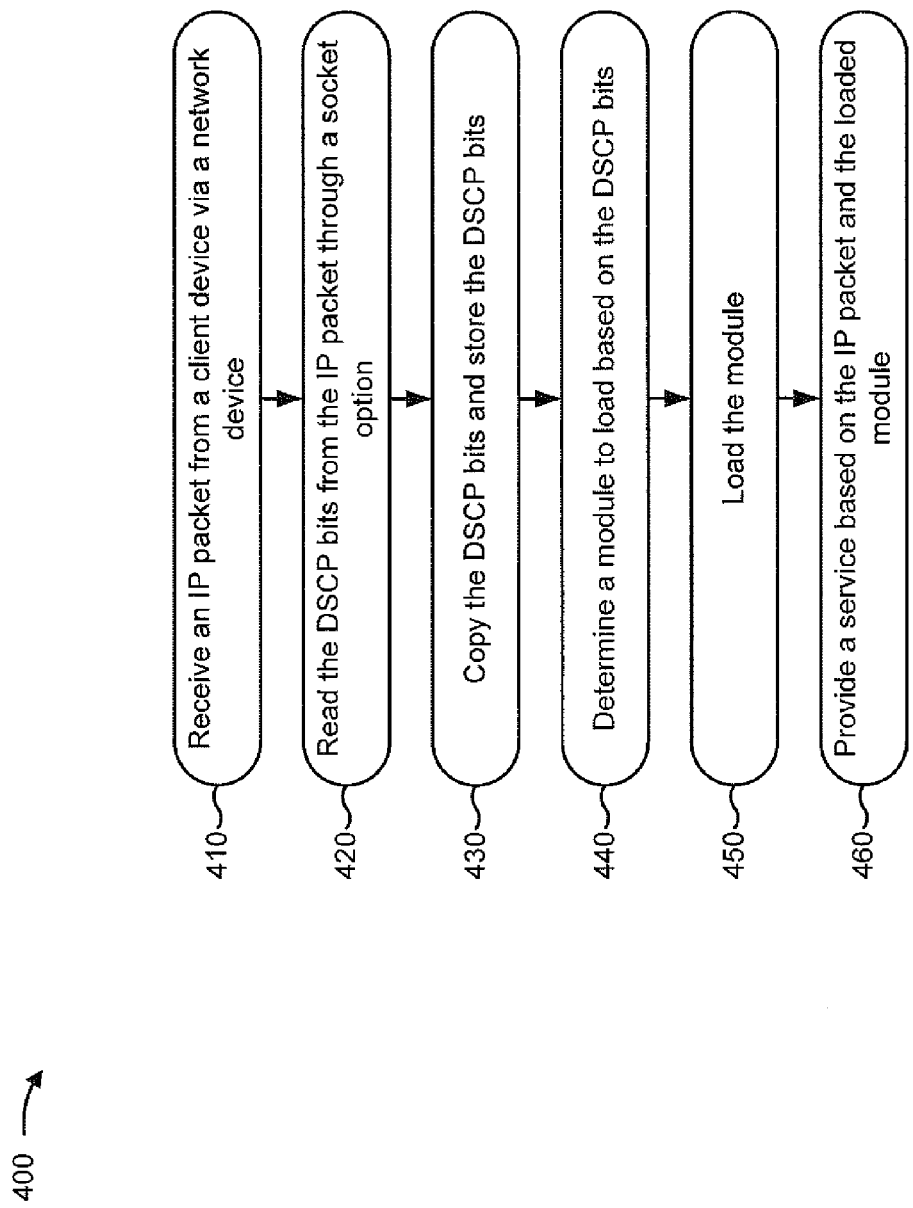
FIG. 4 is a flow chart of an example process for loading a module based on DSCP bits included in an IP packet.

FIG. 4 is a flow chart of an example process 400 for loading a module based on DSCP bits included in an IP packet. In some implementations, one or more process blocks of FIG. 4 may be performed by server device 220. In some implementations, one or more process blocks of FIG. 4 may be performed by another device or a group of devices separate from or including server device 220, such as client device 210 and/or network device 240.

As shown in FIG. 4, process 400 may include receiving an IP packet from client device 210 via network device 240 (block 410). For example, server device 220 may receive the IP packet.

In some implementations, server device 220 may create a socket for receiving IP packets from client device 210. The socket may be an endpoint (e.g., a combination of an IP address, a port number, and/or a protocol) of a two-way communication link between server device 220 and client device 210.

In some implementations, client device 210 may use a transmission control protocol (TCP) to break data, which is to be sent to server device 220, into segments including TCP header information. Client device 210 may encapsulate each TCP segment in an IP packet. Client device 210 may send the IP packet to the socket on server device 220. The IP packet may include an IP header and payload data.

The IP header may be used to deliver the IP packet from client device 210 to server device 220 and may include a Type of Service (ToS) field or a Differentiated Services filed (DS field) that includes DSCP bits. For instance, the first six bits of the ToS field and/or DS field may include the DSCP bits and may indicate QoS properties for routing the IP packet via network 230. For example, the DSCP bits may define the way network devices 240 should queue the IP packet while being forwarded or routed in network 230.

The payload data may be the content data (e.g., data other than the IP header and/or an IP footer in the IP packet) and/or the TCP segment being sent from client device 210 to server device 220. In some implementations, the payload data may include a request for server device 220 to provide a particular service and/or data associated with a particular service provided by server device 220.

In some implementations, client device 210 may set the DSCP bits in the IP packet. For example, client device 210 may set the DSCP bits based on application level policies and the payload of the IP packet. For instance, assume client device 210 executes an application that supports multiple types of service (e.g., a video service, an audio service, a file transferring service, etc.). Client device 210 may set different DSCP bits based on the intended service for the IP packet. For example, the DSCP bits may be set to a first DSCP value when the video service is being used, and the DSCP bits may be set to a second DSCP value when the file transferring service is being used, where the first DSCP value is different than the second DSCP value.

In some implementations, network device 240 may set the DSCP bits in the IP packet. For example, client device 210 may send the IP packet to network device 240 for forwarding to server device 220. Client device 210 may send the IP packet without setting the DSCP bits or with setting the DSCP bits to a default value (e.g., 0). Network device 240 may receive the IP packet and perform an inspection (e.g., a deep packet inspection) to analyze the payload of the IP packet and identify a kind of data (or a type of service associated with the data) included in the payload data. Network device 240 may set the DSCP bits in the IP packet based on the inspection and application level policies.

Network device 240 may forward the IP packet to server device 220 via network 230 according to the DSCP bits. For example, network devices 240 may selectively prioritize routing of IP packets sent from client device 210 to server device 220 based on the DSCP bits included in the IP packet. Server device 220 may receive the IP packet from network device 240 via the socket on server device 220.

As will be discussed in more detail later, in addition to the DSCP bits being used to forward the IP packet to server device 220 via network 230 (e.g., via one or more network devices 240), server device 220 may also load a module for processing the IP packet (e.g., the payload data) based on the DSCP bits.

As further shown in FIG. 4, process 400 may include reading the DSCP bits from the IP packet through a socket option (block 420). For example, server device 220 may read the DSCP bits from the IP packet.

Server device 220 may execute a server device application to request the DSCP bits through a socket option. A socket option may be used to retrieve information from the IP packet at the socket that received the IP packet in real time as the IP packet is received. For example, server device 220 may invoke a listener thread to accept new connections with client device 210 and to listen for IP packets received via the socket. The listener thread may read the DSCP bits through the socket option.

As further shown in FIG. 4, process 400 may include copying the DSCP bits and storing the DSCP bits (block 430). For example, server device 220 may copy the DSCP bits and store the DSCP bits.

In some implementations, an operating system kernel (e.g., a Linux kernel) may be modified to copy the DSCP bits received in the IP header of the IP packet and store the DSCP bits in a data structure associated with the socket. Server device 220 may store the data structure in a memory included in or accessible by server device 220. The DSCP bits may be copied into the data structure in real time whenever the server device application requests the DSCP bits through the socket option.

As further shown in FIG. 4, process 400 may include determining a module to load based on the DSCP bits (block 440). For example, server device 220 may determine the module to load.

In some implementations, server device 220 may offer particular services (e.g., a voice service, a streaming media service, a web traffic service, a file transfer service, etc.). The services may be associated with particular DSCP bits (e.g., a value indicated by the DSCP bits). Each service may use a particular module(s) to process IP packets and communicate with client device 210 that requests the service be provided. Accordingly, server device 220 may determine a module to load based on the service associated with the DSCP bits of the IP packet.

For example, server device 220 may store a reference data structure in a memory included in or accessible by server device 220. The reference data structure may include entries that associate DSCP values indicated by the DSCP bits with modules. For example, each entry may associate a DSCP value with a module to load. For instance, a first entry may associate a first DSCP value with a module used for a video service, and a second entry may associate a second DSCP value with a module used for a file transferring service.

Accordingly, server device 220 may determine a DSCP value of the DSCP bits copied into the memory, query the data structure based on the DSCP value, and determine a module associated with the DSCP value.

Additionally, or alternatively, server device 220 may determine the module to load based on rules stored by server device 220. For example, server device 220 may store rules indicating a module to load based on a particular DSCP value of the DSCP bits copied into the memory.

In some implementations, server device 220 may determine the module to load based on the DSCP bits and before reading the payload of the IP packet. Additionally, or alternatively, server device 220 may determine the module to load based on the DSCP bits and independent of the payload of the IP packet. Accordingly, server device 220 may use fewer resources and increase performance by determining a module to load based on the DSCP bits rather than determining a module to load based on reading the payload of the IP packet.

As further shown in FIG. 4, process 400 may include loading the module (block 450). For example, server device 220 may load the module and use the module to process the IP packet and/or the payload of the IP packet.

As further shown in FIG. 4, process 400 may include providing a service based on the IP packet and the loaded module (block 460). For example, server device 220 may provide the service. For instance, server device 220 may provide the video service, the audio service, the file transfer service, etc. based on processing the IP packet using the loaded module. Client device 210 may receive the service provided by server device 220. For example, client device 210 may receive video content, audio content, file data, etc. from server device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
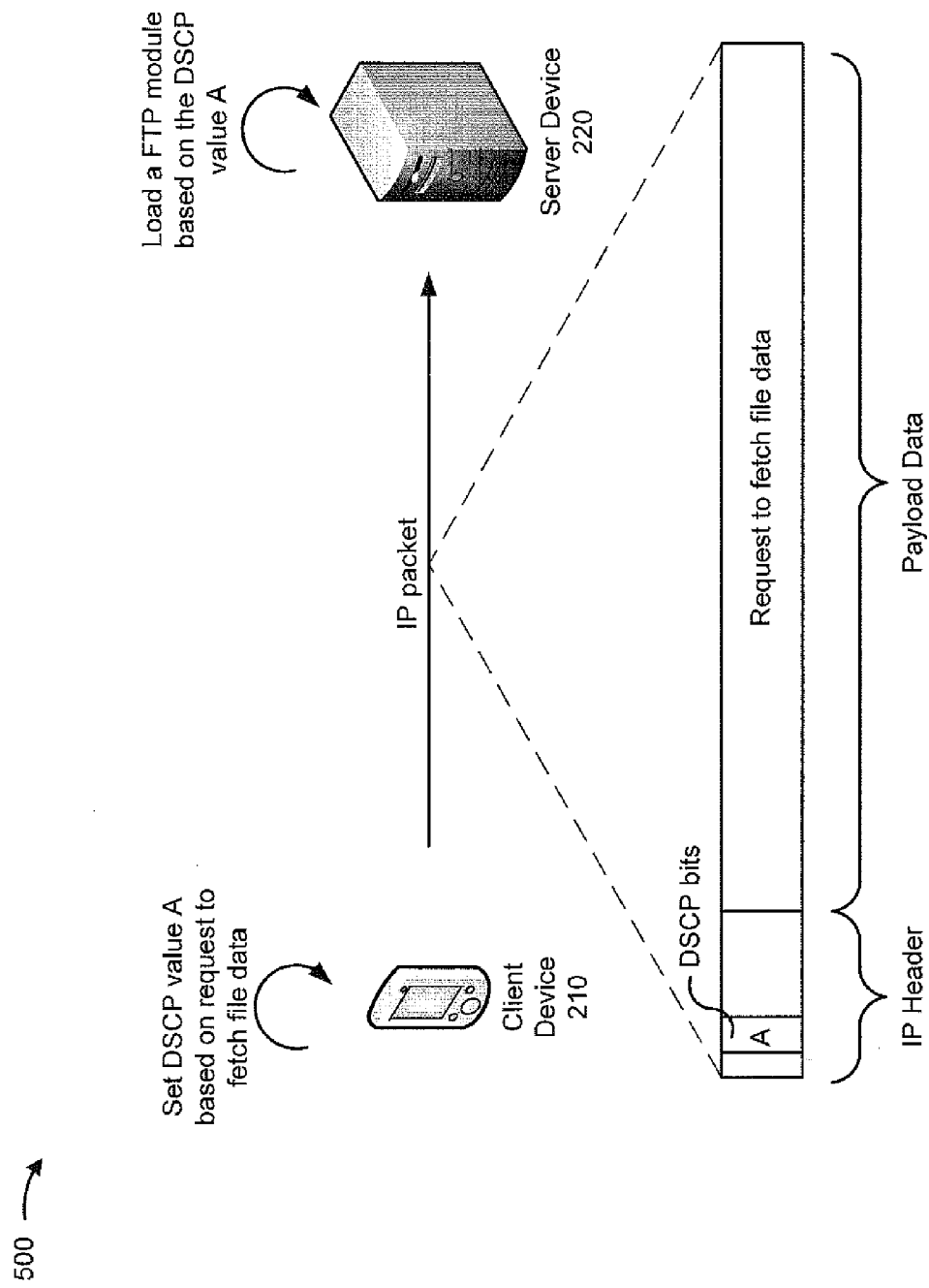
FIGS. 5A and 5B are diagrams of an example implementation relating to the example process shown in FIG. 4.
Figure 5B:
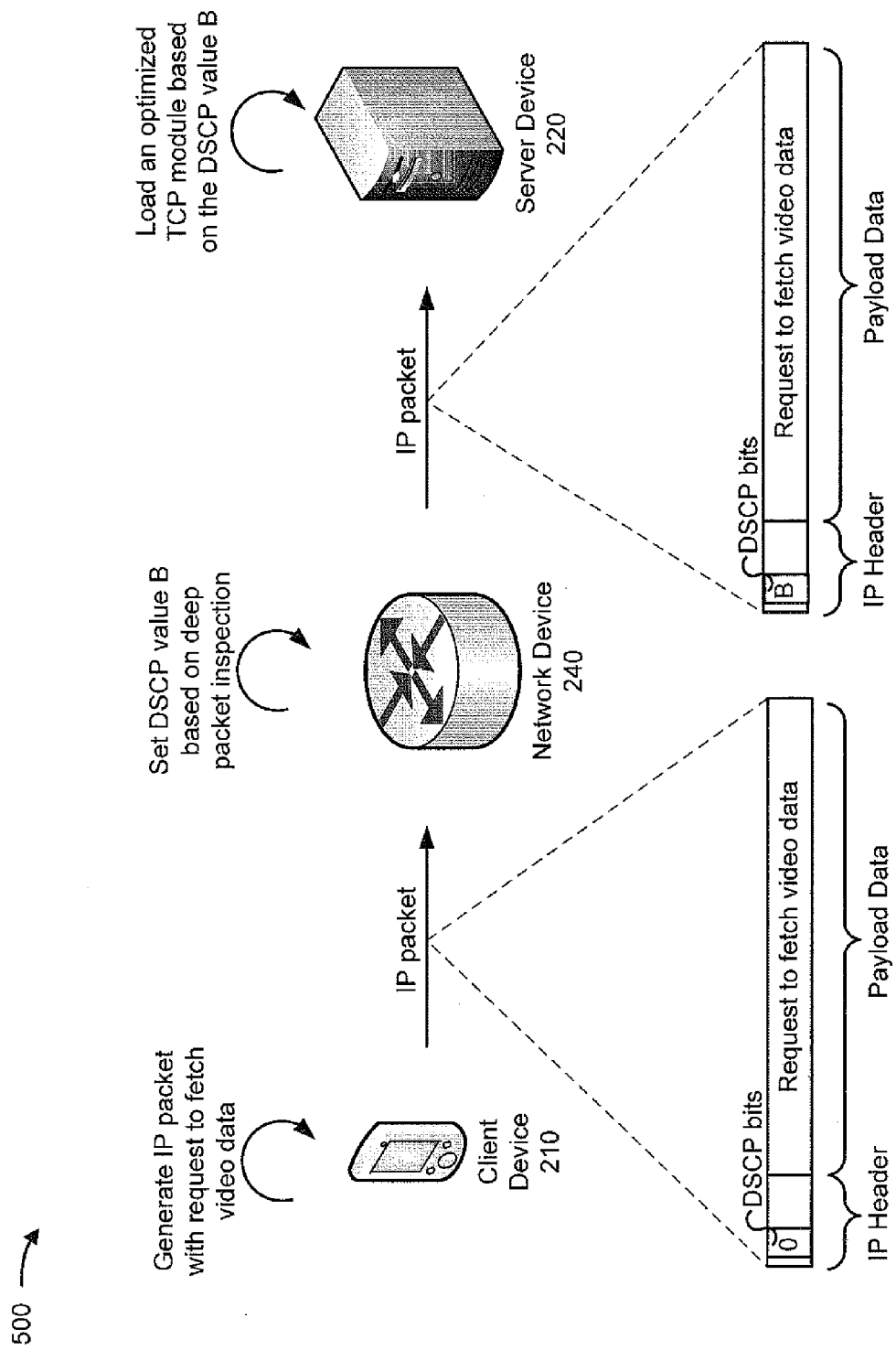

FIGS. 5A and 5B are diagrams of an example implementation 500 relating to example process 400 shown in FIG. 4. FIGS. 5A and 5B show an example of loading a module based on DSCP bits included in an IP packet. In implementation 500, assume client device 210 has a client application installed thereon that communicates with server device 220 to use a file transfer service and a streaming video service provided by server device 220.

In FIG. 5A, assume client device 210 executes the client application to use the file transfer service provided by server device 220. Further, assume client device 210 generates an IP packet to send to server device 220. As shown in FIG. 5A, client device 210 may set the DSCP bits in the IP header of the IP packet to a DSCP value A based on application level polices and based on a payload of the IP packet including a request to fetch file data. Client device 210 may send the IP packet to server device 220 via network 230. Network devices 240 included in network 230 may forward the IP packet to server device 220 based on the DSCP value A indicated by the DSCP bits. Assume the DSCP value A is associated with a low priority and network devices 240 forward the IP packet at the low priority.

Server device 220 may receive the IP packet sent from client device 210 via a TCP socket. Server device 220 may read the DSCP bits included in the IP packet through a socket option and determine the DSCP bits indicate a DSCP value A. Server device 220 may determine the DSCP value A is associated with the file transfer service and a File Transfer Protocol (FTP) module. Server device 220 may make this determination independent of and/or without reading the payload data (e.g., the request to fetch file data) included in the IP packet. Server device 220 may load the FTP module and process the IP packet using the FTP module. Server device 220 may then provide the file transfer service to client device 210 using the FTP module. For example, server device 220 may transfer file data to client device 210.

In FIG. 5B, assume client device 210 executes the client application to use the video streaming service provided by server device 220. Further, assume client device 210 generates an IP packet to send to server device 220. As shown in FIG. 5B, client device 210 may set the DSCP bits in the IP header of the IP packet to a default DSCP value (e.g., 0). The payload data of the IP packet may include a request to fetch video data. Client device 210 may send the IP packet to server device 220 via network 230.

As shown in FIG. 5B, network device 240, included in network 230, may receive the IP packet, from client device 210, to be forwarded to server device 220. Network device 240 may perform a deep packet inspection on the IP packet and determine that the payload data of the IP packet includes the request to fetch video data. Based on the IP packet including the request to fetch video data, network device 240 may set the DSCP bits to indicate a value of B. Assume the DSCP value B is associated with a high priority and network devices 240 forward the IP packet at the high priority to server device 220.

Server device 220 may receive the IP packet sent from client device 210, via network device 240, at a TCP socket. Server device 220 may read the DSCP bits included in the IP packet through a socket option and determine the DSCP bits indicate a DSCP value of B. Server device 220 may determine the DSCP value of B is associated with the streaming video service and a TCP optimization module. Server device 220 may make this determination independent of and/or without reading the payload data (e.g., the request to fetch video data) included in the IP packet. Server device 220 may load the TCP optimization module and process the IP packet based on the TCP optimization module. Server device 220 may then provide the video streaming service to client device 210 using the TCP optimization module. For example, server device 220 may transfer video data to client device 210.

As indicated above, FIGS. 5A and 5B are provided merely as an example. Other examples are possible and may differ from what was described with regard to FIGS. 5A and 5B.

Implementations described herein may load a module based on DSCP bits included in an IP packet. Accordingly, implementations described herein may load a module using fewer resources and with less latency than loading a module by analyzing the payload data of the IP packet.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

While implementations described herein have been described with respect to IP packets, other types of packets may be used. As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  a memory to store instructions; and
  one or more processors, connected to the memory, to execute the instructions to:
    receive an Internet Protocol (IP) packet,
      the IP packet including DiffServ Code Points (DSCP) information and payload data,
      the DSCP information being set to a first value by a client device, and
      the DSCP information being set to a second value based on an inspection of the payload data by a network device that forwards the IP packet from the client device to the device;
    read the DSCP information included in the IP packet received from the network device;
    determine, before reading the payload data, a module to load based on the DSCP information;

load the module; and
provide a service to the client device based on the loaded module and the IP packet.

2. The device of claim 1,
where the one or more processors, when receiving the IP packet, are to:
receive the IP packet via a socket, and
where the one or more processors are further to:
copy the DSCP information in a memory associated with the socket.

3. The device of claim 1, where the one or more processors, when reading the DSCP information included in the IP packet, are to:
read the DSCP information through a socket option.

4. The device of claim 1, where the one or more processors are further to:
cause a server device application to receive the DSCP information through a socket option,
the server device application being used to determine the module to load.

5. The device of claim 1, where the one or more processors, when determining the module to load, are to:
determine the module to load by querying a reference data structure based on the DSCP information.

6. The device of claim 1, where the first value is different from the second value.

7. The device of claim 1, where the payload data includes a request to provide a particular service.

8. A computer-readable medium storing instructions, the instructions comprising:
one or more instructions that, when executed by one or more processors of a device, cause the one or more processors to:
receive a packet,
the packet including a packet header and payload data,
the packet header including DiffServ Code Points (DSCP) information,
the DSCP information being set to a first value by a client device, and
the DSCP information being set to a second value based on an inspection of the payload data by a network device that forwards the packet from the client device to the device;
read the DSCP information included in the packet received from the network device;
determine, before reading the payload data, a module to load based on the DSCP information;
load the module; and
provide a service to the client device based on the loaded module and the packet.

9. The computer-readable medium of claim 8,
where the one or more instructions, that cause the one or more processors to receive the packet, cause the one or more processors to:
receive the packet via a transmission control protocol (TCP) socket, and
where the one or more instructions, when executed by the one or more processors, further cause the one or more processors to:
store the DSCP information in a memory associated with the TCP socket.

10. The computer-readable medium of claim 8, where the one or more instructions, that cause the one or more processors to read the DSCP information, cause the one or more processors to:
read the DSCP information through a socket option.

11. The computer-readable medium of claim 8, where the one or more instructions further cause the one or more processors to:
cause a server device application to receive the DSCP information through a socket option,
the server device application being used to determine the module to load.

12. The computer-readable medium of claim 8, where the one or more instructions, that cause the one or more processors to determine the module to load, cause the one or more processors to:
determine the module to load by querying a reference data structure based on the DSCP information.

13. The computer-readable medium of claim 8, where the first value is different from the second value.

14. The computer-readable medium of claim 8, where the payload data includes a request to provide a particular service.

15. A method, comprising:
receiving, by a server device, an Internet Protocol (IP) packet,
the IP packet including an IP header and payload data,
the IP header including DiffServ Code Points (DSCP) information,
the DSCP information being set to a first value by a client device, and
the DSCP information being set to a second value based on an inspection of the payload data by a network device that forwards the IP packet from the client device to the server device;
reading, by the server device, the DSCP information included in the IP header of the IP packet received from the network device;
determining, by the server device and before reading the payload data, a module to load based on the DSCP information;
loading, by the server device, the module; and
providing, by the server device, a service to the client device based on the loaded module and the IP packet.

16. The method of claim 15,
where receiving the IP packet comprises:
receiving the IP packet via a socket, and
where the method further comprises:
copying the DSCP information into a memory associated with the socket.

17. The method of claim 15, where reading the DSCP information included in the IP header comprises:
reading the DSCP information through a socket option.

18. The method of claim 15, further comprising:
causing a server device application to receive the DSCP information through a socket option,
the server device application being used to determine the module to load.

19. The method of claim 15, where determining the module to load comprises:
determining the module to load by querying a reference data structure based on the DSCP information.

20. The method of claim 15, where the first value is different from the second value.

* * * * *